(12) United States Patent
Shore

(10) Patent No.: US 8,805,164 B2
(45) Date of Patent: *Aug. 12, 2014

(54) METHOD AND APPARATUS FOR CREATING A CUSTOM TRACK

(75) Inventor: Michael W. Shore, Dallas, TX (US)

(73) Assignee: CAPShore, LLC, Dallas, TX (US)

( * ) Notice: Subject to any disclaimer, the term of this patent is extended or adjusted under 35 U.S.C. 154(b) by 922 days.

This patent is subject to a terminal disclaimer.

(21) Appl. No.: 12/763,555

(22) Filed: Apr. 20, 2010

(65) Prior Publication Data

US 2010/0324919 A1 Dec. 23, 2010

Related U.S. Application Data

(63) Continuation-in-part of application No. 11/491,269, filed on Jul. 21, 2006.

(60) Provisional application No. 60/802,913, filed on May 24, 2006.

(51) Int. Cl.
| | |
|---|---|
| *G11B 27/00* | (2006.01) |
| *H04N 5/93* | (2006.01) |
| *G11B 27/02* | (2006.01) |
| *G11B 27/031* | (2006.01) |
| *G11B 27/034* | (2006.01) |

(52) U.S. Cl.
CPC ............... *G11B 27/02* (2013.01); *G11B 27/031* (2013.01); *G11B 27/034* (2013.01)
USPC ............................ 386/278; 386/281; 386/285

(58) Field of Classification Search
CPC ...... G01B 27/00; G11B 27/02; G11B 27/031; G11B 27/0341
USPC .......................... 386/230, 239–242, 278–299
See application file for complete search history.

(56) References Cited

U.S. PATENT DOCUMENTS

| | | | |
|---|---|---|---|
| 5,841,512 | A | 11/1998 | Goodhill |
| 5,999,173 | A | 12/1999 | Ubillos |
| 6,078,005 | A | 6/2000 | Kurakake et al. |
| 6,320,600 | B1 | 11/2001 | Smith et al. |
| 6,507,953 | B1 | 1/2003 | Horlander et al. |
| 6,597,375 | B1 | 7/2003 | Yawitz |
| 6,635,816 | B2 | 10/2003 | Funaki |
| 6,710,785 | B1 | 3/2004 | Asai et al. |

(Continued)

OTHER PUBLICATIONS

Office Action Issued Oct. 3, 2008 in U.S. Appl. No. 11/491,269.

(Continued)

*Primary Examiner* — Gelek W Topgyal
(74) *Attorney, Agent, or Firm* — Panitch Schwarze Belisario & Nadel LLP

(57) ABSTRACT

A method and system for creating and editing video and/or audio tracks is described. The method includes providing at least one artist, venue, and track available for selection and providing at least one clip associated with the at least one artist, venue, and track. The method also includes allowing a user to create a custom track from the at least one clip. The system includes a plurality of video cameras for recording a live performance at a plurality of positions. The system also includes at least one server for storing a plurality of video clips created from the plurality of video cameras and an application stored on the at least one server for allowing a user to access the plurality of video clips via the Internet.

49 Claims, 12 Drawing Sheets

(56) References Cited

U.S. PATENT DOCUMENTS

| | | | |
|---|---|---|---|
| 6,882,793 B1 | 4/2005 | Fu et al. | |
| 7,028,329 B1 | 4/2006 | Mizutani | |
| 7,392,226 B1 * | 6/2008 | Sasaki et al. | 705/64 |
| 7,603,321 B2 | 10/2009 | Gurvey | |
| 7,945,935 B2 | 5/2011 | Stonedahl | |
| 2001/0041050 A1 * | 11/2001 | Iwata et al. | 386/52 |
| 2002/0188943 A1 | 12/2002 | Freeman et al. | |
| 2002/0196327 A1 | 12/2002 | Rui et al. | |
| 2003/0004916 A1 | 1/2003 | Lewis | |
| 2003/0026461 A1 | 2/2003 | Arthur Hunter | |
| 2004/0062525 A1 | 4/2004 | Hasegawa et al. | |
| 2004/0071321 A1 | 4/2004 | Watkins et al. | |
| 2004/0117427 A1 | 6/2004 | Allen et al. | |
| 2006/0064536 A1 | 3/2006 | Tinker et al. | |
| 2006/0092938 A1 | 5/2006 | Gentrix | |
| 2006/0104600 A1 | 5/2006 | Abrams | |
| 2006/0224451 A1 * | 10/2006 | Kerschbrock et al. | 705/14 |
| 2007/0288978 A1 | 12/2007 | Pizzurro et al. | |
| 2008/0027827 A1 | 1/2008 | Eglen et al. | |
| 2008/0065249 A1 | 3/2008 | Pang | |
| 2008/0172704 A1 | 7/2008 | Montazemi | |
| 2009/0042622 A1 | 2/2009 | Tsui et al. | |
| 2009/0121474 A1 * | 5/2009 | Hughes | 283/100 |
| 2009/0150947 A1 | 6/2009 | Soderstrom | |
| 2009/0290024 A1 | 11/2009 | Larson et al. | |
| 2010/0049657 A1 * | 2/2010 | Aichroth et al. | 705/59 |
| 2010/0180297 A1 | 7/2010 | Levine et al. | |
| 2010/0185502 A1 | 7/2010 | Roberts et al. | |
| 2010/0188485 A1 | 7/2010 | Abrams | |
| 2010/0220197 A1 | 9/2010 | Dukellis et al. | |
| 2011/0078571 A1 | 3/2011 | Asbahr et al. | |
| 2011/0112913 A1 | 5/2011 | Murray | |
| 2011/0196726 A1 | 8/2011 | Poellnitz | |
| 2012/0096357 A1 | 4/2012 | Folgner et al. | |

OTHER PUBLICATIONS

Office Action Issued Sep. 17, 2009 in U.S. Appl. No. 11/491,269.
Office Action Issued Feb. 5, 2010 in U.S. Appl. No. 11/491,269.
Office Action Issued Jul. 23, 2010 in U.S. Appl. No. 11/491,269.
Office Action Issued Jan. 7, 2011 in U.S. Appl. No. 11/491,269.
Office Action Issued Oct. 29, 2008 in U.S. Appl. No. 11/588,627.
Office Action Issued May 13, 2009 in U.S. Appl. No. 11/588,627.
Office Action Issued Jul. 14, 2009 in U.S. Appl. No. 11/588,627.
Office Action Issued Oct. 5, 2009 in U.S. Appl. No. 11/588,627.
Office Action Issued Mar. 31, 2010 in U.S. Appl. No. 11/588,627.
Office Action Issued Jul. 23, 2010 in U.S. Appl. No. 11/588,627.
Office Action Issued Jan. 7, 2011 in U.S. Appl. No. 11/588,627.
How Our iPTV Solutions Work; TikiLive.org website, dated Jun. 14, 2012.
Want to Live Stream Over Facebook? Da Cast Shows You How; http://gigaom.com/video/dacast-facebook-live-streaming/ Date: Apr. 18, 2012 Author: Ryan Lawler.
SnappyTV Set to Debut Socially-Connected, Cloud-Bawsed Live Video Editor During 2012 State of the Union Address Date: Jan. 17, 2012.
U.S. Appl. No. 13/594,070 by Shore, filed Aug. 24, 2012.
Office Action issued Apr. 2, 2013 in U.S. Appl. No. 13/594,070.
U.S. Appl. No. 13/463,390 by Shore, filed May 3, 2012.
Office Action issued Jun. 23, 2011 in U.S. Appl. No. 11/588,627.
Office Action issued Jun. 23, 2011 in U.S. Appl. No. 11/491,269.
Office Action issued Nov. 18, 2013 in U.S. Appl. No. 13/463,390.
Office Action issued Oct. 17, 2013 in U.S. Appl. No. 13/594,070.
Office Action issued Jun. 27, 2013 in U.S. Appl. No. 13/594,070.
U.S. Appl. No. 13/901,060 by Shore, filed May 23, 2013.
U.S. Appl. No. 13/901,079 by Shore, filed May 23, 2013.

* cited by examiner

METHOD AND APPARATUS FOR CREATING A CUSTOM TRACK

CROSS-REFERENCE TO RELATED APPLICATIONS

This application is a continuation-in-part of U.S. patent application Ser. No. 11/491,269, filed on Jul. 21, 2006, entitled "Method and Apparatus for Creating a Custom Track," which claims the benefit of U.S. Provisional Patent Application No. 60/802,913, filed on May 24, 2006, entitled "Method and Apparatus for Creating Custom Tracks," the entire contents of all of which are incorporated by reference herein.

BACKGROUND OF THE INVENTION

Embodiments of the present invention generally relate to the storage and creation of video and/or audio tracks and, more particularly, to creating custom video tracks from multiple video sources.

Millions of music fans attend concerts at numerous venues every year. As many artists and recording companies have recognized, video and/or audio recordings of live concerts are a very popular and successful sales item. However, in most cases fans must wait for months, if not years, to obtain quality live recordings of a concert—if the recordings are available at all. In addition, many fans would prefer to have a recording of the concert that they attended as opposed to another venue that was chosen either by the artist or recording company for mass production.

It is desirable to allow a user to create and purchase video tracks, audio tracks, still images, or any combination thereof from a performance that was captured via audio and/or video, e.g., a concert or a pay-per-view television show.

BRIEF SUMMARY OF THE INVENTION

One embodiment relates to a method for creating a custom track. The method includes providing at least one artist, venue, and track available for selection and providing at least one clip associated with the at least one artist, venue, and track. The method also includes allowing a user to create one or more custom tracks from the at least one clip, or from multiple clips, coming from one or more venues, or one or more live performances.

Another embodiment relates to a system for capturing and storing video tracks from a live performance. The system includes a plurality of video cameras for recording a live performance at one or more positions. An additional embodiment allows for multiple audio tracks as well. The system also includes at least one server for storing a plurality of audio clips, video clips, or still images created from the one or more video cameras and sound receiving devices, and an application stored on the at least one server. The at least one server can be an e-commerce or other type of server thereby allowing a user to access the plurality of video clips via the Internet, and, if desired, make a custom and personalized copy of a the videos, images, and audio tracks captured and stored.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE PREFERRED EMBODIMENTS

Figure 1:
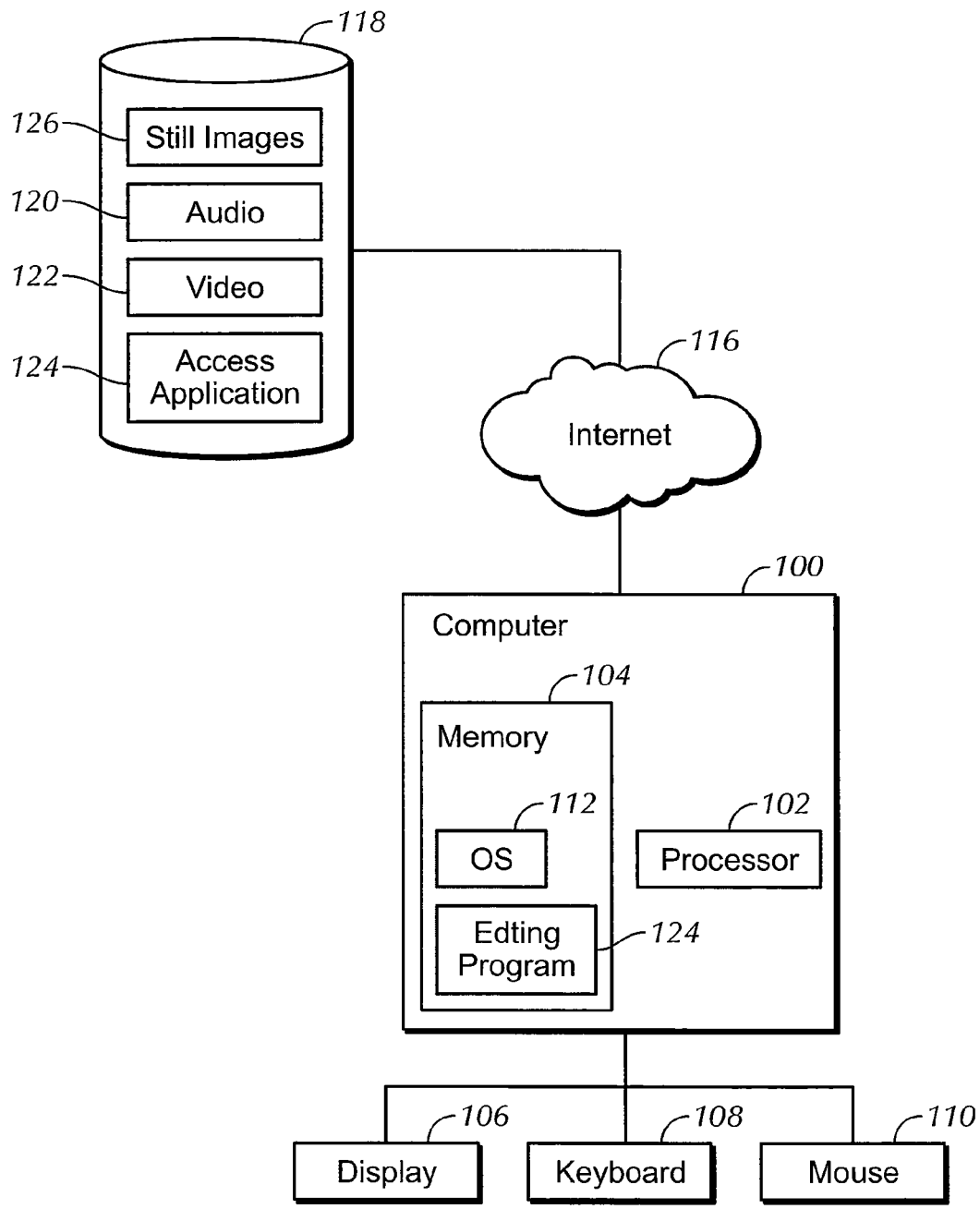
FIG. 1 is a block diagram of a system in accordance with one embodiment of the present invention.

FIG. 1 illustrates a computer 100 for use with some of the embodiments of the present invention. The computer 100 is operated by a user or a venue to create a video or audio track. The computer 100 includes a processor 102, memory 104, a display 106, a keyboard 108, and a mouse 110. Stored within the memory 104 is at least an operating system 112 and an editing program 114. The editing program 114 is used to create the video or audio tracks. The computer 100 accesses a server 118 storing video tracks 122, audio tracks 120, and an access application 124 through the Internet or a private network.

The server 118 stores audio tracks, video tracks, and/or still images 126 that may be obtained from various cameras and sound receiving devices at venues located around the world. The tracks may be fed to the server 118 live via streaming video and audio, the tracks may be stored in another location and then downloaded to the server 118, or a combination thereof. For example, a venue may choose to download the tracks to another location or system in order to manipulate the files to include timing information or perform other editing of the tracks. The venue may also add embedded information regarding the date of recordation and the venue name. In addition, some venues may wish to delay user access to the tracks until after the concert has ended. Although embodiments of the present invention may reference a live musical performance, embodiments of the present invention are also applicable to backstage recordings, television shows, pay-per-view shows, or the like. According to aspects of the present invention, a user may edit or customize the viewing of, e.g., a basketball game, a television show, or a reality television show by switching camera angles, audio tracks, or the like.

In addition, the tracks available for download at the server 118 may be ISO images, streaming video, or other format such as MP3, or MPEG2 or 4. Streaming video allows for digital rights management (DRM) to prevent unauthorized copying of content. ISO images may have a DRM watermark to identify unauthorized reproductions. Although embodiments of the present invention may use ISO images, streaming video, and watermarks, it will be readily understood by one skilled in the art that various other formats of video and video protection may be utilized without departing from aspects of the present invention.

The tracks may also be tiered based on a specific relationship, such as time or number of hits. For example, the first tier may be the most recent tracks to be added to the server 118 and/or the tracks with the most hits. The second tier may be made up of less requested tracks and/or tracks that have been available for a specific length of time, e.g., one month, one year, or the like. The older or least favorite tracks may then be archived. The first tier of tracks may be provided to the user by default, or all tracks from all tiers may be provided to the user for selection.

Figure 2:
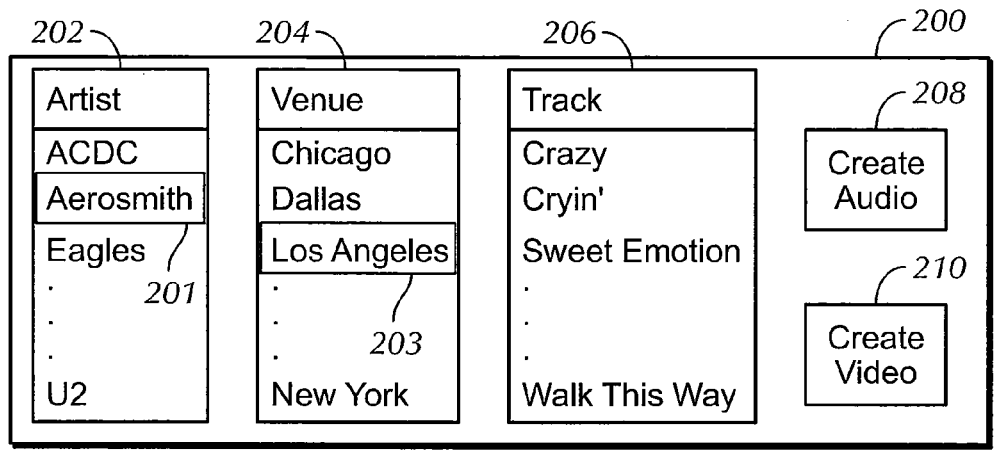
FIG. 2 is a screen shot in accordance with an embodiment of the present invention.

When tracks become available at the server 118 for download by the public, the access application 124 may be initiated to allow a user to select and purchase video tracks, audio tracks, still images, or any combination thereof. FIG. 2 illustrates an exemplary screen shot of the access application 124 in accordance with an embodiment of the present invention. Although the access application 124 is shown and described with a particular layout, it will be readily apparent to one skilled in the art that many aspects of the screen shot may be altered without departing from embodiments of the present invention.

A user, through the computer 100, accesses the Internet 116 in order to start the access application via the screen shown in the screen shot 200. The screen shot 200 includes an artist window 202, a venue window 204, and a track window 206. The windows 202, 204, 206 are preferably menus that provide values for selection by the user. The windows 202, 204, 206 may be provided as complete menus, scrolling menus, drop-down menus, or other formats of presenting selections to a user. Although the menus shown are directed to the categories of artists, venues, and tracks (or songs), other categories may be utilized, such as shows, camera angles, audio tracks, or the like. For example, the user may be presented with a list of individuals from which to select, and a subsequent menu may be populated with artists associated with the selected individual.

Preferably, based at least in part on a first selection 201 made by the user from a menu, a second menu is populated with values from a second category, wherein the values are associated with the selection from the first menu. For example, if the user selected the artist Aerosmith, the venue window 204 may populate or adjust selections accordingly. For instance, the venues available for selection in the venue window 204 would be the venues at which Aerosmith has played. A further selection 203 made by the user from the venue window 204 may also cause the track window 206 to populate or adjust selections of songs performed by Aerosmith in Los Angeles.

Figure 14:
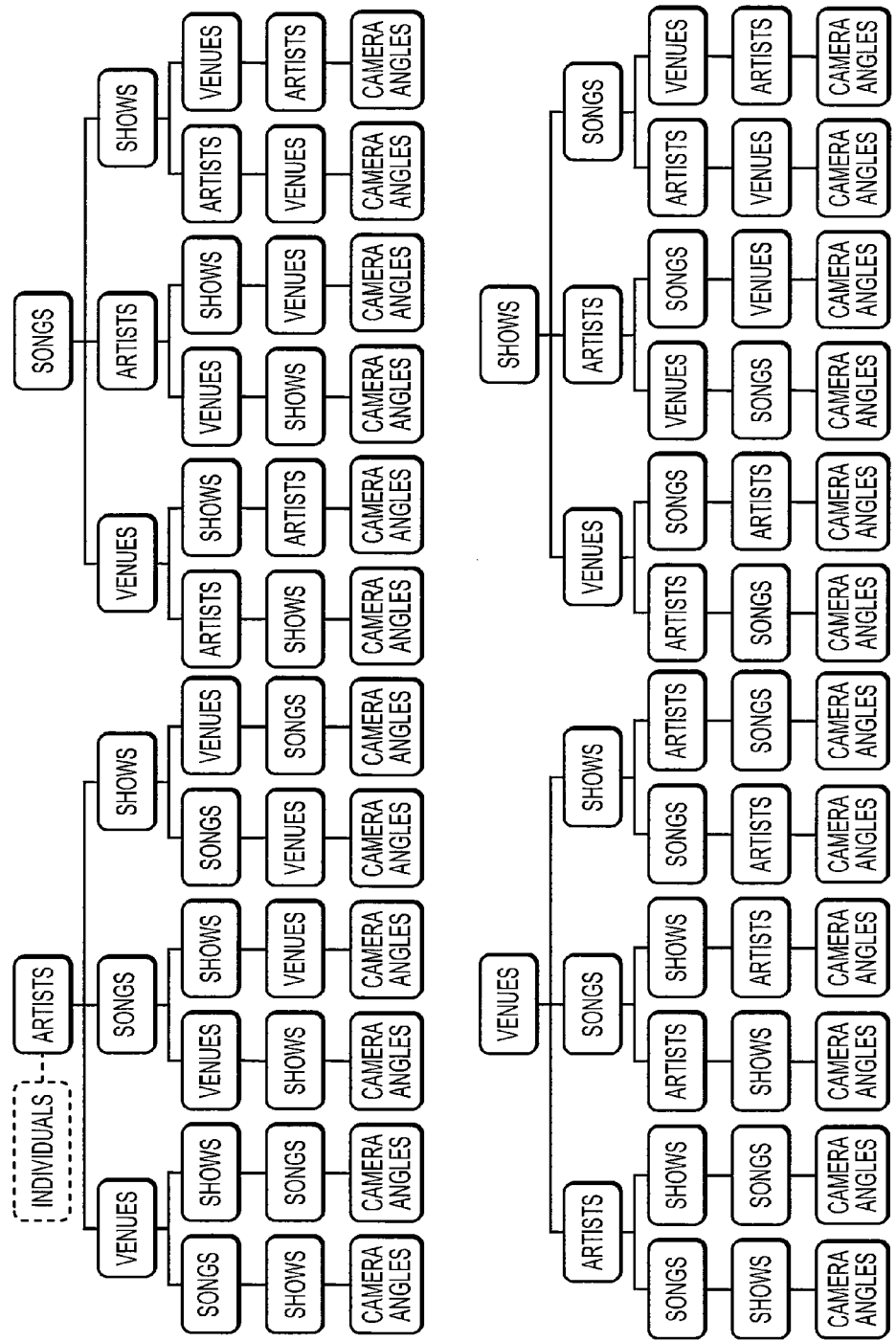
FIG. 14 illustrates several decision trees for graphical user interface menus in accordance with embodiments of the present invention.

It is understood that any number of categories and menus may be utilized, with selections by the user providing the path to obtaining clips for use in creating the custom track. For example, FIG. 14 illustrates a number of decision trees that may be utilized by the user to obtain desired clips for use in his or her custom track. The illustrated decision trees are not limiting, and any categories to assist the user in locating desired clips may be used. It is further understood that the clips may be provided at any point along the decision trees, and the user need not necessarily reach the bottom level in order to be provided with clips for use in creating the custom track.

Although the adjustment or population of selections in the windows 202, 204, and 206 is preferred, it is also possible to merely black out non-available selections or leave all selections available regardless of previous selections made by the user. The user may select one or more tracks at a time in order to create a compact disc (CD) of one or more songs or a video track of one or more performances at one or more venues.

When the user has determined the artist, venue, and track or portion of a track from which he wishes to create a video or audio track, the user then determines to create either an audio track via button 208 or a video track via button 210.

Figure 3:
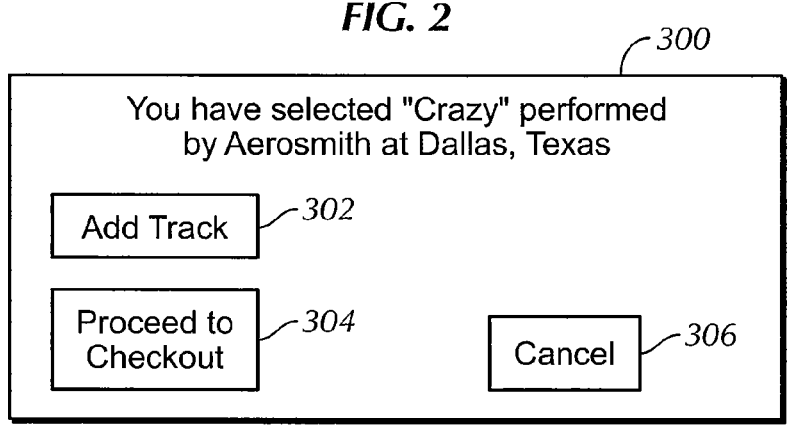
FIG. 3 illustrates a screen shot in accordance with an embodiment of the present invention.

If the user presses button 208, the user proceeds to screen shot 300 illustrated in FIG. 3. The user may either add additional tracks to the previously selected track via button 302 or proceed to checkout via button 304. The user may also cancel the order by pressing a cancel button 306. In addition, although the following descriptions relate to creating a custom video track from multiple camera sources, it will be understood by one skilled in the art that a user may create custom audio tracks from multiple sound recording devices. In a manner similar to that shown in FIGS. 5-8, a user may select a particular sound recording device from multiple sound recording devices placed strategically throughout the venue. For example, the user may wish to purchase an audio track composed of audio recorded from a device near a drummer, a device near the lead singer, and a device near the lead guitarist or any combination thereof.

Figure 4:
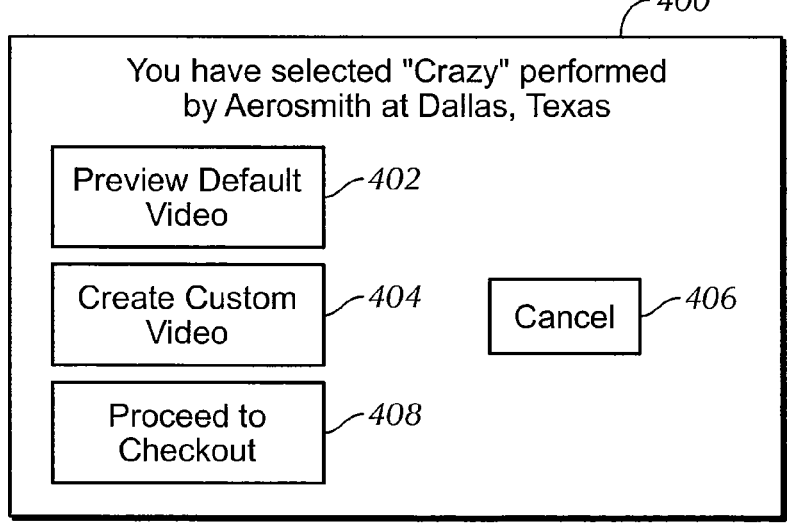
FIG. 4 illustrates a screen shot in accordance with an embodiment of the present invention.

Instead, if the user presses button 210, the user proceeds to screen shot 400 illustrated in FIG. 4. Although the remainder of the process will be described with reference to one video track, as noted above, it is also contemplated that the user may select multiple video tracks, multiple audio tracks, or a combination of both.

In a preferred embodiment of the screen shot 400 shown in FIG. 4, a confirmation of the chosen track, artist, and venue appears on the screen. The access application 124 provides the option of previewing a default video track previously created for purchase by pressing button 402. The user may instead prefer to create a custom video track by pressing button 404. If the user selects the default video track, the user may preview the track with, for example, a pop-up window. The user may then choose to purchase the default video track or cancel the operation and create a custom video track. If the user selects the default video track, he may then select additional video tracks to include in his purchase, or the user may purchase the one video track by checking out via button 408. The user may also cancel the order by pressing the cancel button 406.

Figure 5:
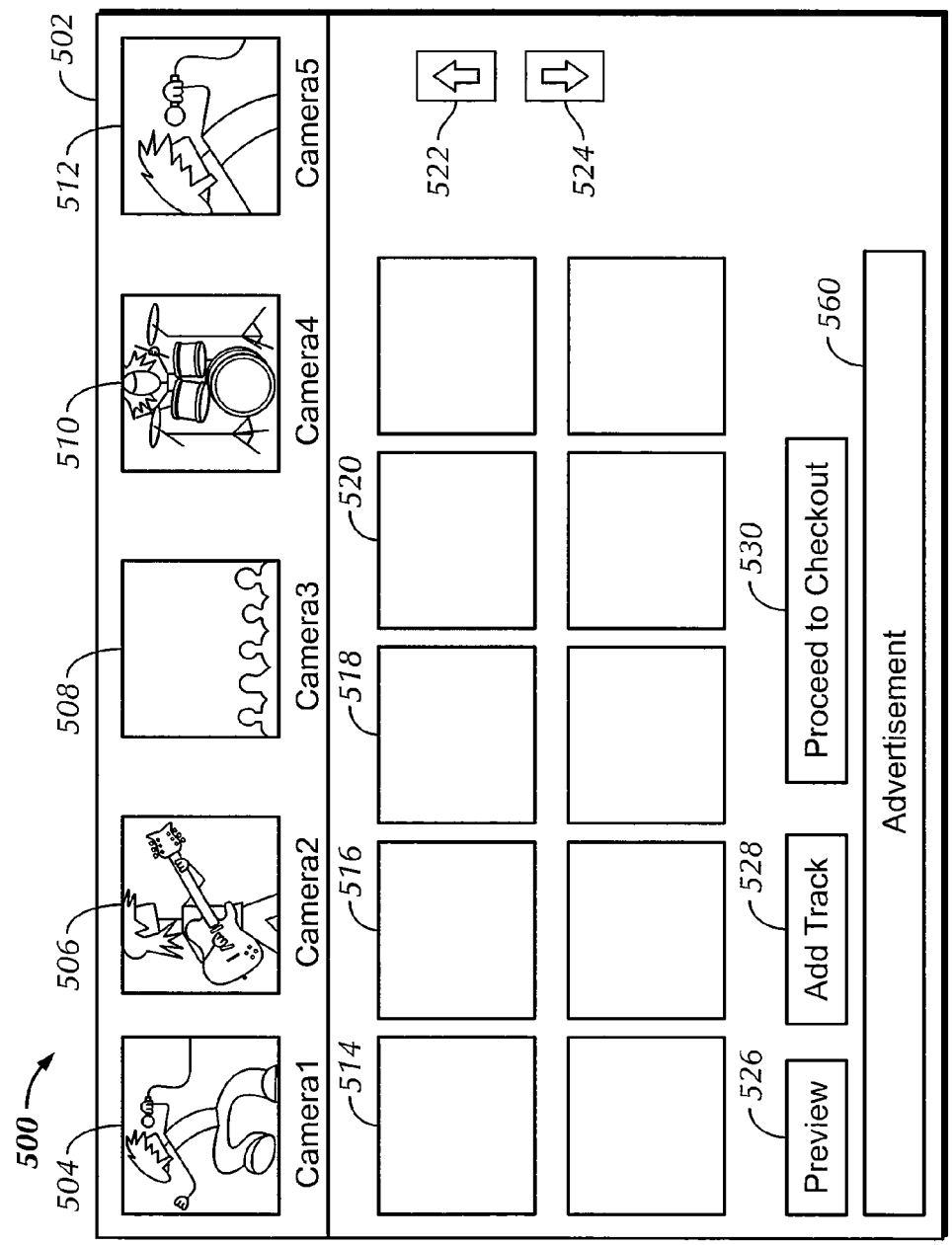
FIG. 5 illustrates a screen shot in accordance with an embodiment of the present invention.

If the user decides to create a custom track, he proceeds to screen shot 500 illustrated by FIG. 5. Although the following video editing application is described with particular characteristics, it will be understood by one skilled in the art that any method of video editing may be used in accordance with embodiments of the present invention. In this particular embodiment, the editing program utilized to create screen shot 500 is located on the user's computer 100.

In a preferred embodiment, a bar 502 across the top portion of the screen 500 previews tiles 504, 506, 508, 510, and 512 associated with a particular camera or camera angle. For example, multiple cameras may have recorded various areas of the stage and/or crowd during a concert. The tiles 504, 506, 508, 510, and 512 may be representative of a still image from the video track, may feature a preview video of the video track, or the like. Alternatively, the tiles 504, 506, 508, 510, and 512 may be of a specific color or have specific text on them to denote different tiles. The user may then drag the tiles to placeholders 514, 516, 518, and 520 on the lower portion of the screen 500. The user may also scroll through the placeholders 514, 416, 518, and 520 with scroll buttons 522 and 524.

Further, at least one advertisement 560 may be provided to the user. The advertisement 560 may be interactive and is preferably in the form of a banner advertisement, although the advertisement could also be in the form of a separate web page that is temporarily displayed before, during, or after access to the program, or may be a commercial that is displayed with the custom track, or the like. The advertisement 560 may also change based on elapsed time, changing pages, or the like. Multiple advertisements 560 may also be displayed. It will be understood by those skilled in the art that the owner of the access application is typically compensated by an advertiser in exchange for displaying the advertisement 560. The advertisement may also be a watermark 660 (see FIG. 6) on the custom track. The watermark 660 may be a temporary watermark or a watermark that is displayed throughout playback of the custom track. The advertisement may sponsor at least one song or a series of songs in the custom track, a segment of the custom track, or the like.

Figure 6:
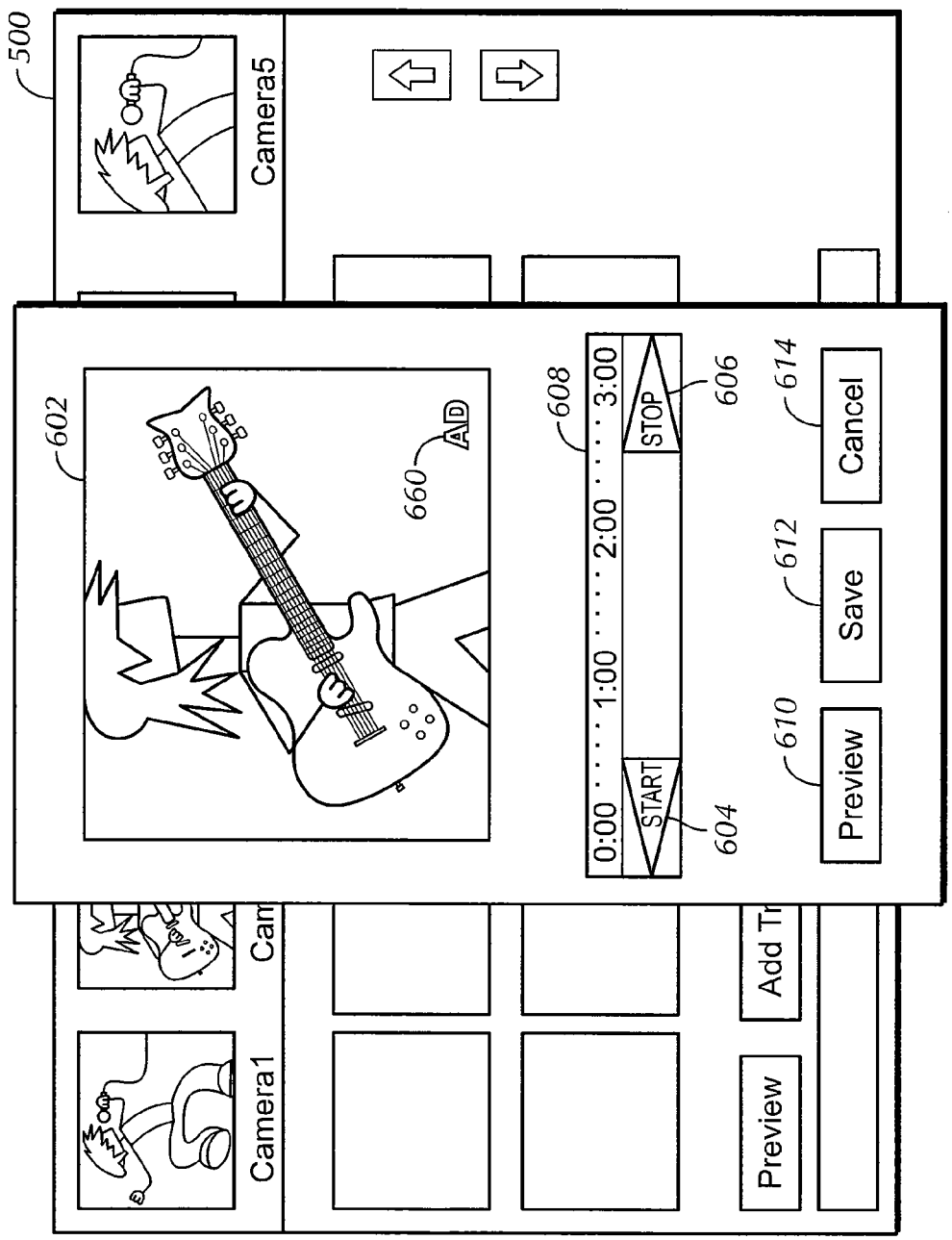
FIG. 6 illustrates a screen shot in accordance with an embodiment of the present invention.

The user may select a particular portion of a video clip represented by a tile 504, 506, 508, 510, and 512 by selecting a particular start and end time as shown in FIG. 6. For example, the selected video clip 602 may appear in a window 600. The start and end times may be adjusted by sliding start flag 604 and stop flag 606 along a time bar 608. Once a start and stop time are selected, the user may preview the edited video clip 602 by pressing the preview button 610. The edited video clip 602 may be saved by pressing save button 612 or edits may be canceled by pressing the cancel button 614. When the edited video clip 602 is saved or canceled, the user returns to screen 500 shown in FIG. 5.

The user then may continue by selecting another tile depicting another video clip from a different camera. The user then determines the appropriate start time to coincide with the end of the previous edited video clip. Of course, the user may select additional video clips, tracks, or both to create a complete video or use only one video track. The custom track may be created from audio and/or video taken from multiple venues, can be created using multiple songs, or other similar combinations of artists, venues, and songs. For example, a user may be provided with a plurality of video tracks and at least one audio track from a first live performance, and a second set of video tracks and at least one audio track from a second live performance. The user may be permitted to select portions of one audio track and assemble the custom track from the plurality of video tracks from both live performances. The live musical performances can be from the same or different venues, can have occurred at the same or different times, and the like. The user therefore has total customization to assemble a custom track to include any audio and/or video from one or more performances. Once the video is completed, the user may preview the entire video, or portions thereof, in a pop-up window or other preview screen by pressing button 526. The user may add special effects, fades between camera angles, or the like before completing the video. When complete, the user may continue by selecting another track by pressing button 528 or proceed to check out by pressing button 530. If the user selects another track, the user repeats the process by displaying the tiles 504, 506, 508, 510, and 512 associated with the selected track. When adding another track, the user may select another artist or another venue, or the same artist and venue.

Figure 7:
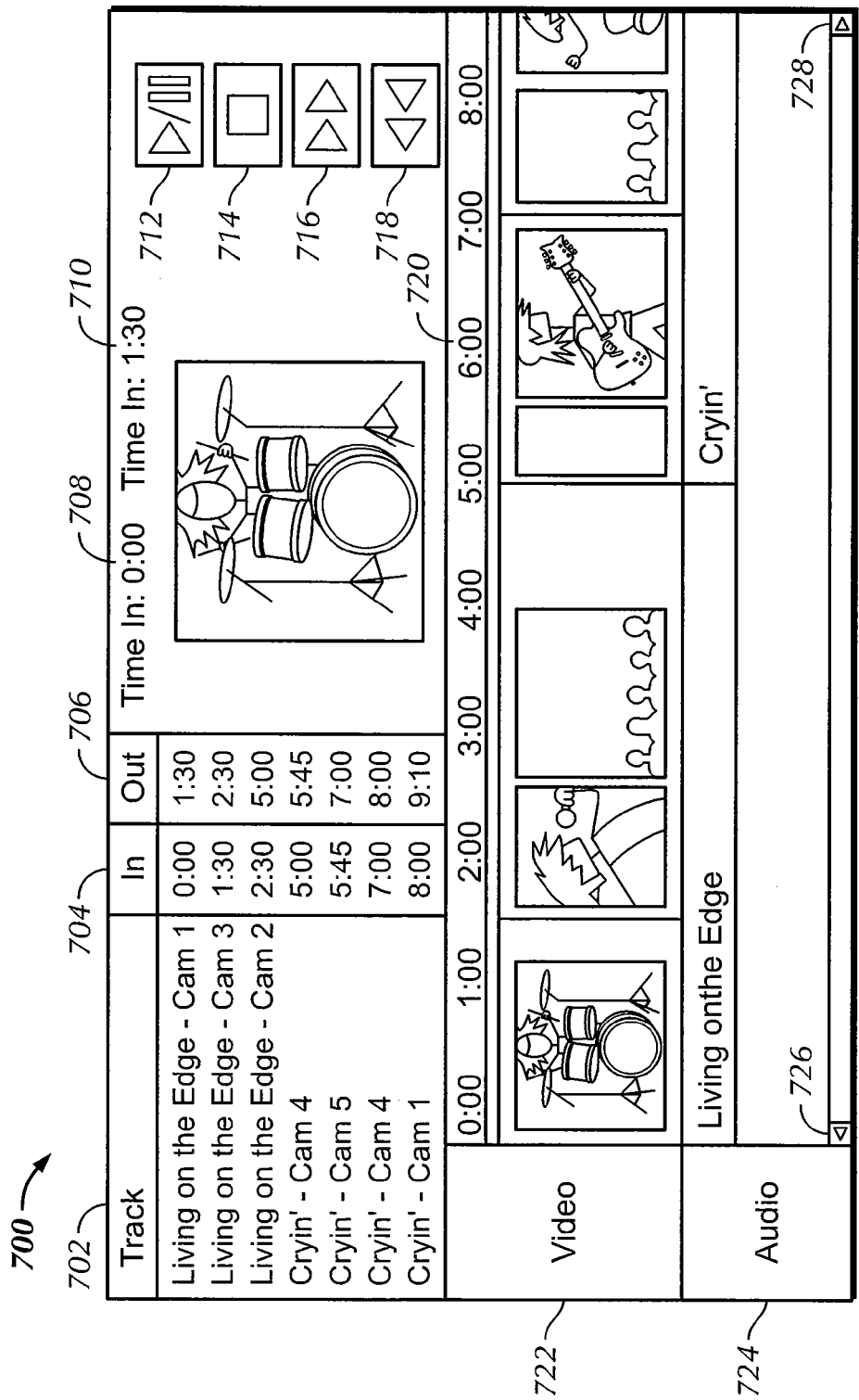
FIG. 7 illustrates a screen shot in accordance with an embodiment of the present invention.

FIG. 7 illustrates an alternate embodiment of a screen shot 700 for editing video tracks. In this screen shot 700 an upper portion of the screen allows a user to view the tracks in a track window 702. The in and out times are also viewable through an in window 704 and an out window 706. The user may add, remove, select, delete, or the like tracks from the track window 702 as desired. The remainder of the upper portion of the screen may be used to view the video tracks and edit the in and out times. For example, a time in window 708 allows the user to edit the in time of the chosen video track. Similarly, a time out window 710 allows the user to edit the out time of the chosen video track. The user may play, pause, stop, rewind, or fast forward the video track as desired with buttons 712, 714, 716, and 718.

A lower portion of the screen 700 may be devoted to timing of the video clips. In this embodiment, a time bar 720 is shown along with the selected clips at their respective in and out times. The lower portion of the screen 700 may include a video portion 722 for viewing the selected video clips and an audio portion 724 for viewing the selected audio tracks. In addition, the lower portion may include scroll buttons 726 and 728 for scrolling through the edited tracks.

Figure 8:
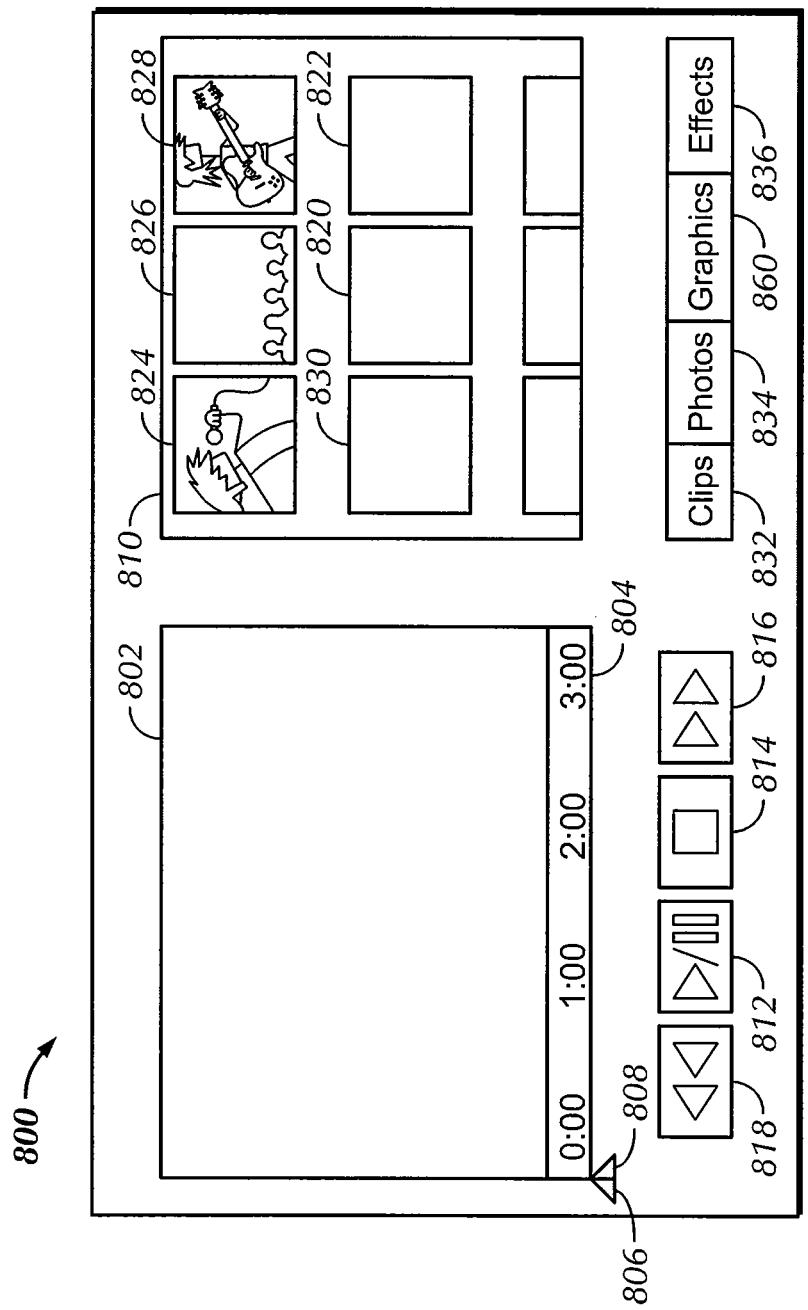
FIG. 8 illustrates a screen shot in accordance with an embodiment of the present invention.

In FIG. 8, a screen shot 800 of an additional alternate embodiment is illustrated. In this particular embodiment, a preview screen 802 is located at one portion of the screen 800 with a time bar 804 at the lower portion of the preview screen 802. The time bar 804 allows the user to edit the start and end times of the clip with arrows 806 and 808. Similar to the previous embodiments, the user may view the clip with play/pause, stop, fast forward, and rewind buttons 812, 814, 816, and 818. Another portion of the screen includes a clip window 810. The clip window 810 includes placeholders 820 and 822 for placing clips 824, 826, 828, and 830. The user may import additional clips or photos by pressing the clips button 832 or photos button 834, respectively. The user may also add special effects to the video track by pressing the effects button 836. The user may also add graphics to the video track by pressing the graphics button 860. Graphics can include one or more of dates, labels, song titles, band names, lyrics, or the like. In addition, the user or the venue may customize titles of the tracks, CD, or digital video disc (DVD). The cover art for the CD/DVD may also be customized by the user or venue.

Figure 9:
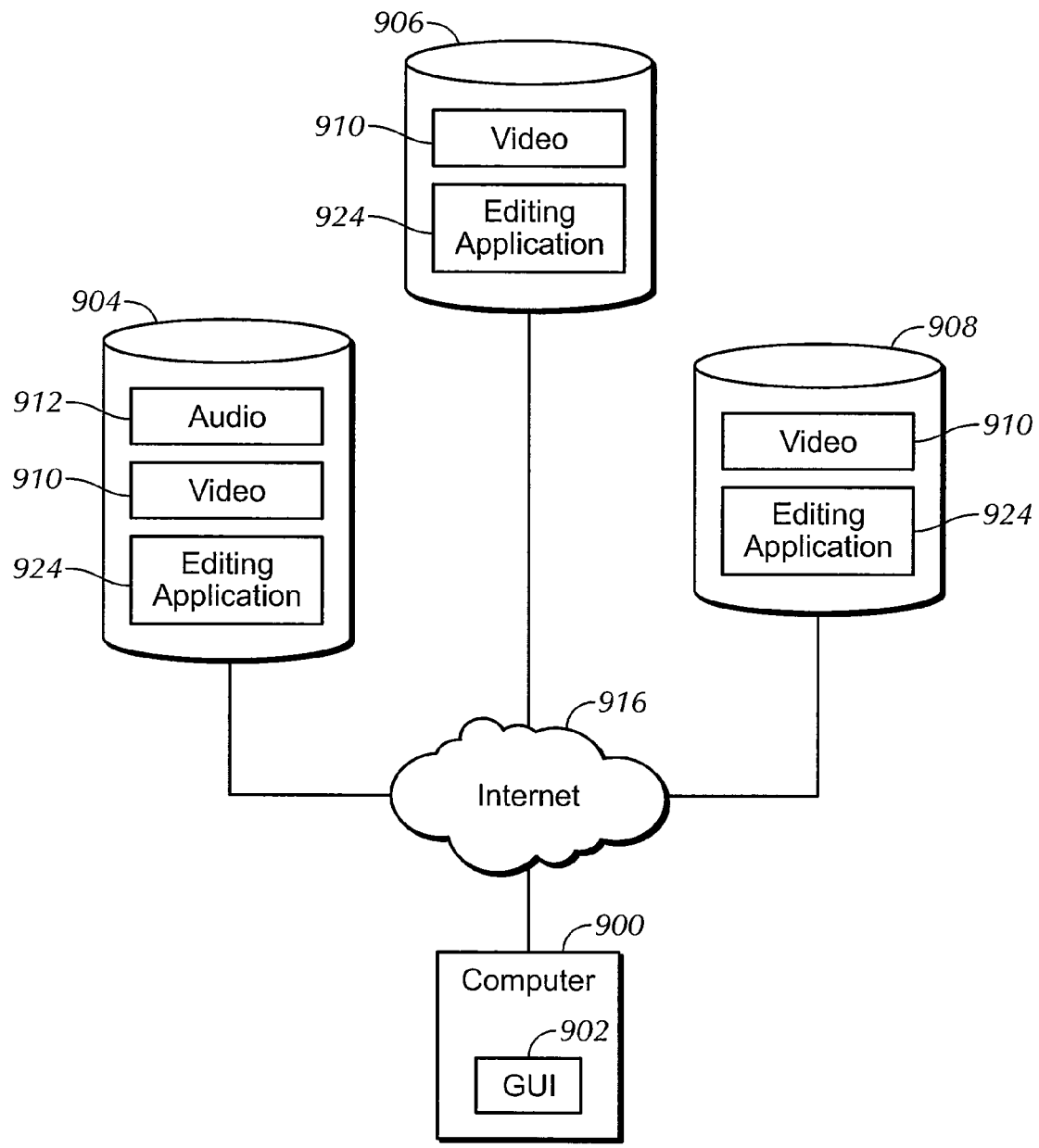
FIG. 9 illustrates a block diagram of a system in accordance with an embodiment of the present invention.

FIG. 9 illustrates an alternate embodiment of a system of the present invention. Here, the user may access the Internet 916 via a computer 900 in order to access a web-based editing application 924. In this embodiment, the computer 900 accesses servers 904, 906, and 908 to create and purchase audio and/or video tracks. The servers 904, 906, 908, store video tracks 910, audio tracks 912, and an editing application 924. The editing application 924 and access to stored video and audio tracks 910 and 912 are run remotely via a graphical user interface (GUI) 902 at the user's computer 900. The GUI 902 allows the user to view, create, and edit video and audio tracks 910 and 912 in a manner similar to that shown in FIGS. 2-8.

Although the present embodiment illustrates three servers for storing video and audio tracks as well as the editing application, it will be understood by one skilled in the art that fewer servers or more servers may be utilized in accordance with aspects of the present invention. A distributed, networked system as shown can allow storage capacity in the petabyte range with downloads of a gigabyte-per-second or more. By adjusting the number of servers, the type of storage systems used, as well as utilizing parallel data input and output, storage capacity and download speed can be increased or decreased as desired and as economics dictate. For example, a petabyte of storage and gigabyte-per-second download speeds support the storage and download of high-definition digitized video, should the user desire high-definition video.

Figure 10:
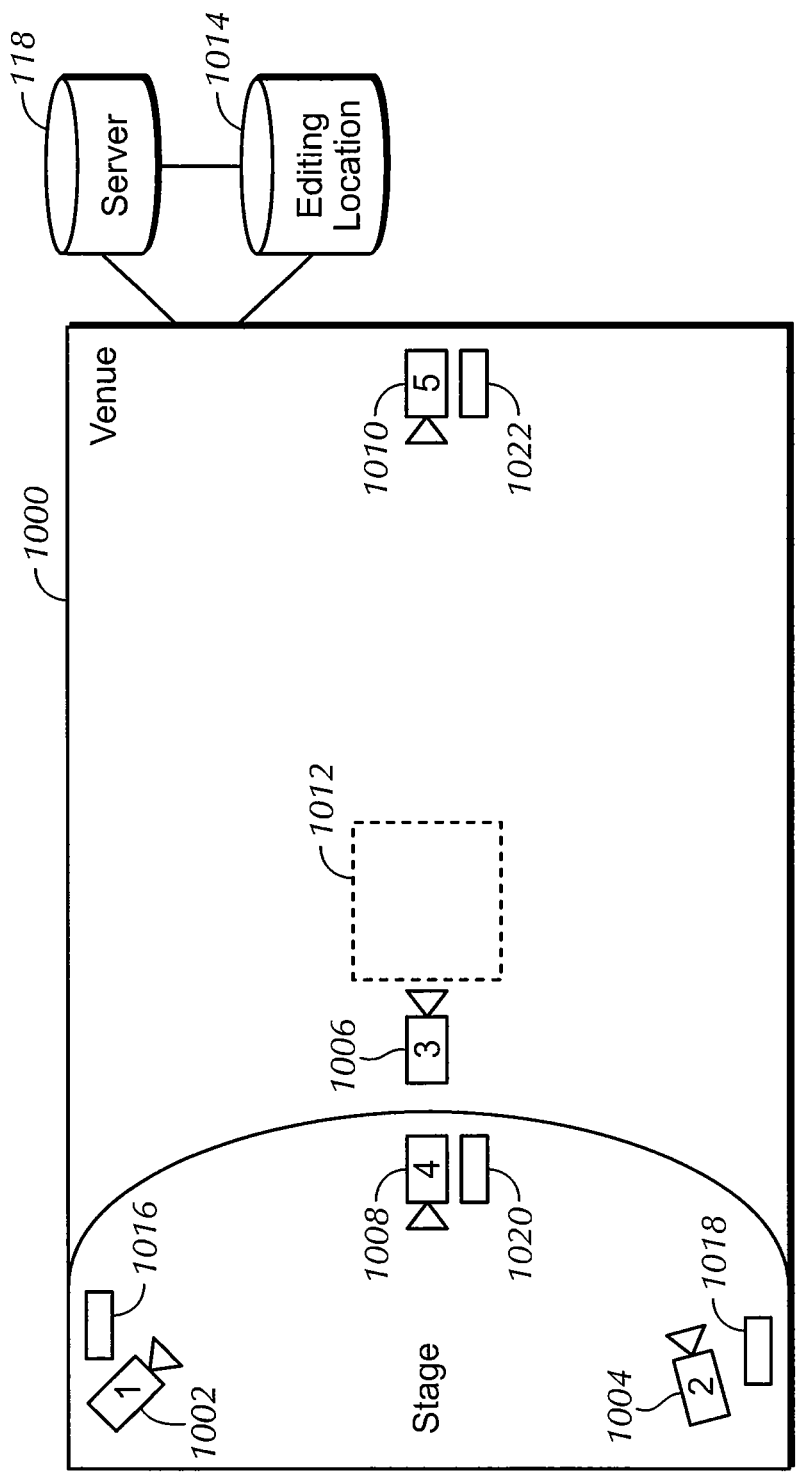
FIG. 10 illustrates a diagram of a system in accordance with an embodiment of the present invention.

FIG. 10 depicts an exemplary system for capturing video tracks in accordance with an embodiment of the present invention. As previously noted, a venue 1000 may wish to capture video from several angles from one or more cameras 1002, 1004, 1006, 1008, and 1010. In the preferred embodiment, there are several cameras 1002, 1004, 1006, 1008, and 1010 that capture video from several different locations. For example, cameras 1 and 2 1002 and 1004 may capture video from the rear corners of the stage. Camera 3 1006 may capture video of the audience. The cameras may pan to different areas or specifically capture only one location. Camera 3 1006 may be fixed to a particular location, such as an area 1012 defined by the venue 1000. Members of the audience may stand in the designated area 1012 to ensure that they are captured on the video of camera 3 1006. In the preferred embodiment, camera 5 1010 is located at the far end of the venue 1000 from the stage. In a similar manner, sound recording devices 1016, 1018, 1020, 1022 may also be placed throughout the venue 1000, either together or separate from the video cameras 1002, 1004, 1006, 1008, 1010. Although the preferred embodiment shown in FIG. 10 depicts a particular camera/sound recording device layout with five cameras and four sound recording devices, it will be understood by one skilled in the art that fewer cameras and recording devices or more cameras and recording devices may be utilized and the placement of the cameras/sound recording devices may be varied as desired by the particular venue 1000.

The video recorded from the camera 1002, 1004, 1006, 1008, and 1010 may be fed to the server 118 for availability to the public, or the video may be fed to an editing storage location 1014. Alternatively, the video could be fed to both the server 118 and the editing storage location 1014. At the editing storage location 1014, the video can be edited, default video tracks may be set up, digital management rights and/or watermarks may be embedded, or other actions may be performed on the video. Once the actions are completed, the video may then be uploaded to the server 118. One server 118 is illustrated in this particular embodiment, however, as previously described with reference to FIG. 9, several servers may be utilized in conjunction with embodiments of the present invention.

Figure 11:
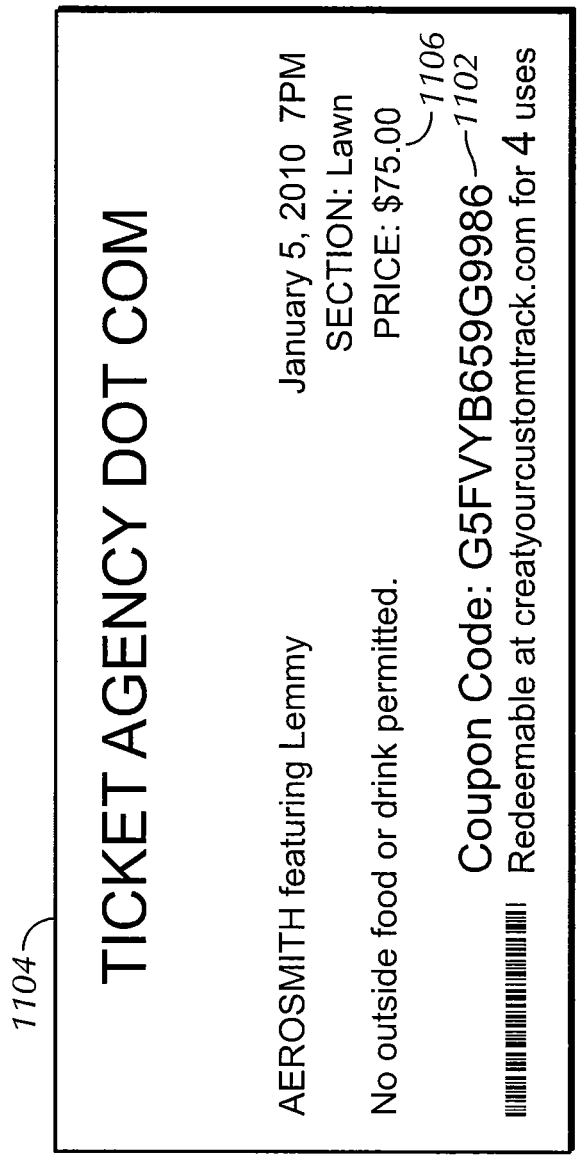
FIG. 11 illustrates a ticket bearing a discount or coupon code in accordance with an embodiment of the present invention.

In addition, the venue 1000 may allow attendees of the concert a discount, a credit, or a certain number of free downloads in exchange for paying for a ticket to the concert (see e.g., FIG. 11). For example, the venue 1000 may stamp or print a discount or coupon code 1102 on the ticket 1104 itself or hand out coupons at the venue 1000 itself. The attendee may then go to the Internet, access the GUI or application and enter the discount code when creating a track. Also, the venue may receive a fee for every purchased track recorded at that venue. Preferably, the discount or coupon code 1102 is limited to a predetermined number of uses 1106, and the predetermined number may be tied to the purchase price 1108 of the ticket 1104, that is, more uses are available for a higher ticket purchase price.

Figure 12:
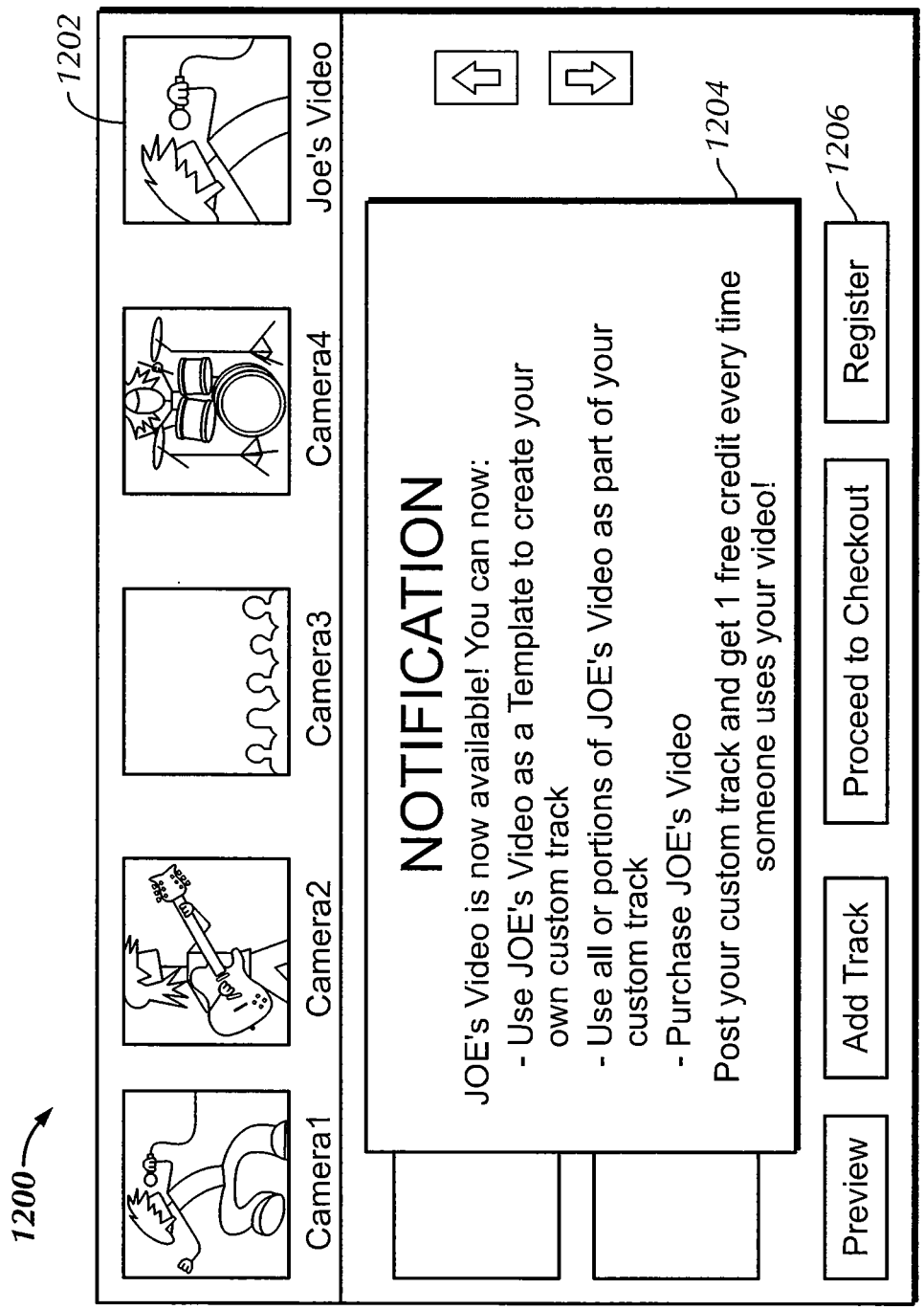
FIG. 12 illustrates a screen shot in accordance with an embodiment of the present invention.

In FIG. 12, a screenshot 1200 of an additional alternate embodiment is illustrated. Upon completion of a custom track, a user may make the custom track 1202 available to other users. Other users may then use the first user's custom track 1202 or portions thereof for creating their own custom tracks (i.e., the first user's custom track 1202 is used like the videos 504, 506, 508, 510, and 512 in FIG. 5), purchase the custom track 1202, use the custom track 1202 as a template for their own custom tracks, or perform like operations. Preferably other users may be notified when the first user's custom track 1202 becomes available. Notifications, such as the notification 1204 shown in FIG. 12, may be automatically sent to other users, such as those on a customer list. Notifications may also be sent by email, text message, social network post, or the like. A user preferably may select whether to receive notifications, or select which other users from which to receive notifications. For example, users may have the option to register to receive notifications, such as via the "Register" button 1210, and be added to a registration list. Notifications would then be sent to the users on the registration list. Additionally, the creator of the custom track 1202 may choose to selectively send notification to certain other users.

The creator of the custom track 1202 preferably receives compensation when one or more other users utilize the custom track 1202. For example, the creator may receive one or more credits for creating more custom tracks or for covering at least a portion of the cost for using the access application. The credits may also be good for obtaining tickets, merchandise, or other items. The creator may also directly receive money or other tangible goods in exchange for having the custom track 1202 used by others. In any event, at least one of the creator of the custom track 1202 and the entity providing the custom track 1202 on the Internet receives compensation when the custom track 1202 is used or purchased by another user.

The cost to the user for creating a custom track may be determined in any number of ways, and is preferably calculated upon checkout. For example, the cost may be based on the time the user spent accessing the access application for creating the custom track. The cost may also be based on the number of songs, performances, artists, or the like accessed by the user. The cost may also be based on the length of the created custom track. Alternatively, weekly, monthly, yearly, or the like fees may be charged for access. A predetermined fee may also be set for accessing a predetermined number of performances, artists, or venues. Combinations of the above-described fee arrangements are also contemplated. Premiums for users to access the materials may also be established on, for example, a ticket price of a live performance attended by the user, the number of times the user's track is accessed by others, premiums required by the performers or the venue, or combinations thereof.

Figure 13:
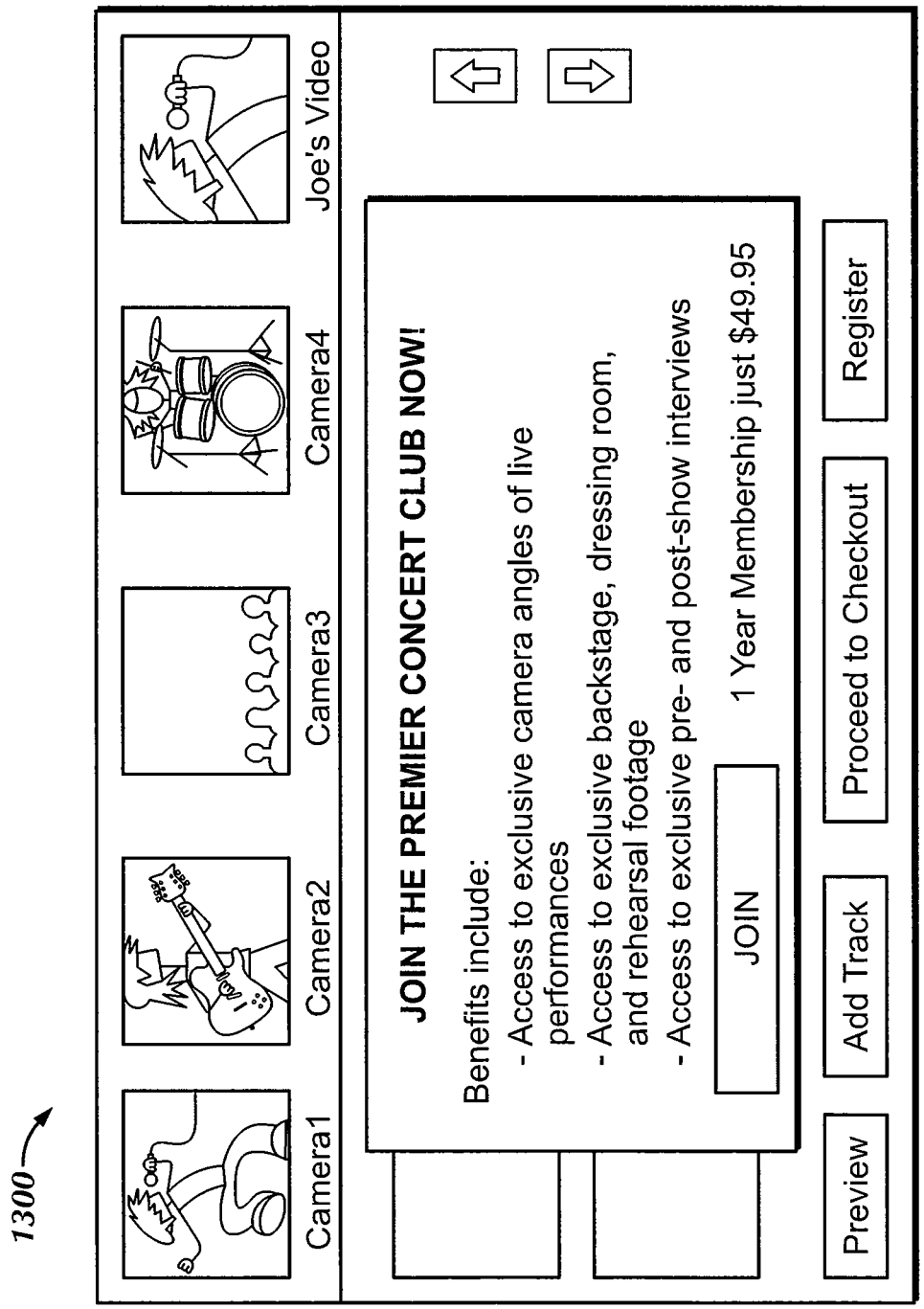
FIG. 13 illustrates a screen shot in accordance with an embodiment of the present invention.

In FIG. 13, a screenshot 1300 of an additional alternate embodiment is illustrated. A club may be created that users are permitted or encouraged to join. Belonging to the club can allow a user access to additional material not accessible by non-club users. For example, the user may have access to additional video camera views of one or more of the live musical performances, a dressing room, a backstage area, pre-performance interviews, post-performance interviews, or the like.

It is to be understood that the above-described embodiments are simply illustrative of the principles of the present invention. Various modifications may be made by those skilled in the art without departing from aspects of the embodiments of the present invention. For example, various changes may be made to the graphical user interface (GUI), access application, and screen shots depicted in FIGS. 2-8 and 12-13 while still embodying aspects of the present invention. In addition, the access application and/or the editing application may be stored at the user's computer and not at the server. The methods and applications described above may be implemented in hardware, firmware, software, or combinations thereof, or in a computer program product tangibly embodied in a computer readable storage device. It should also be understood that where a video clip is illustrated in some of the exemplary embodiments, in some instances this can be simply an audio clip, a synchronized audio/video clip, or an unsynchronized audio/video stream.

I claim:

1. A method for creating a custom track, the method comprising:
   providing at least one artist, venue, and audio track available of a live musical performance, the live musical performance including at least one complete song for selection;
   providing at least two pre-recorded video clips associated with the at least one artist, venue, and audio track;
   allowing a first user to create a first custom track from at least a portion of the audio track and the at least two video clips, the first user being permitted to select a portion of one of the at least two video clips for use in the first custom track by specifying a start time and an end time of the portion of the video clip, wherein changes to only the audio track by the user are subject to third party preapproved parameters; and
   making the first custom track available to at least one second user.

2. The method of claim 1, wherein a credit that allows the first user to create the first custom track is provided with a concert ticket.

3. The method of claim 2, wherein the credit is provided as a printed code on the concert ticket.

4. The method of claim 3, wherein the printed code is limited to a predetermined number of uses.

5. The method of claim 4, wherein the predetermined number of uses is based on a purchase price of the concert ticket.

6. The method of claim 1, wherein the first user receives compensation when the at least one second user utilizes the first custom track.

7. The method of claim 6, wherein the first user is compensated by one of credits for creating custom tracks and money.

8. The method of claim 7, wherein the first user is compensated by credits, and the credits allow the first user to purchase at least one of tickets, merchandise, or time for creating custom tracks.

9. The method of claim 1, further comprising:
   notifying the at least one second user that the first custom track is available.

10. The method of claim 9, wherein the notification is sent automatically to the at least one second user.

11. The method of claim 9, wherein the notification is provided by at least one of email, text message, or social network post.

12. The method of claim 9, further comprising:
   creating a customer list including the at least one second user.

13. The method of claim 1, further comprising:
   allowing the first user to add graphics to the first custom track.

14. The method of claim 13, wherein the graphics are at least one of dates, labels, song titles, band names, and lyrics.

15. The method of claim 1, further comprising:
   registering the at least one second user;
   creating a registration list of users that have registered; and
   notifying the users on the registration list.

16. The method of claim 1, wherein the first custom track is created using at least two venues.

17. The method of claim 1, wherein the first custom track is created using at least two different songs.

18. The method of claim 1, further comprising:
   providing a menu of effects for use by the first user to create the first custom track.

19. The method of claim 1, wherein the at least one second user is permitted to purchase at least a portion of the first custom track.

20. The method of claim 1, wherein the at least one second user is permitted to create a second custom track from at least a portion of the first custom track.

21. The method of claim 1, wherein the first custom track is available as a template to the at least one second user.

22. The method of claim 1, further comprising:
   creating a club including at least one club user, wherein the at least one club user has access to additional video camera views of at least one of the live musical performance, a dressing room, a backstage area, pre-performance interviews, or post-performance interviews.

23. The method of claim 1, further comprising:
   establishing a premium for the first user based on at least one of a ticket price of the live performance attended by the first user, a number of times the first custom track is used by additional users, or a premium established by the artist or the venue.

24. The method of claim 1, wherein the third party is one of the artist, the venue, or a system owner.

25. A method for creating a custom track, the method comprising:
   providing at least one artist, venue, and audio track available of a live musical performance, the live musical performance including at least one complete song for selection;
   providing at least two pre-recorded video clips associated with the at least one artist, venue, and audio track;
   allowing a first user to create a first custom track from at least a portion of the audio track and the at least two video clips, the first user being permitted to select a portion of one of the at least two video clips for use in the first custom track by specifying a start time and an end time of the portion of the video clip, wherein changes to only the audio track b the user are subject to third party preapproved parameters; and
   making the first custom track available to at least one second user, at least one of an entity providing the first custom track and the first user receiving compensation when the at least one second user utilizes the first custom track.

26. The method of claim 25, wherein the third party is one of the artist, the venue, or a system owner.

27. A system for capturing and storing video tracks from at least one live performance, the system comprising:
   a plurality of video cameras for recording the at least one live musical performance, the live musical performance including at least one complete song performance at a plurality of positions;
   at least one server for storing a plurality of video tracks created from the plurality of video cameras and an audio track common to the plurality of video tracks; and
   an application stored on the at least one server, the at least one application being configured to:
     (i) allow a first user to access the audio track and the plurality of video tracks via an Internet link to create a first custom track by selecting at least a portion of the audio track and combining at least two clips from at least two of the plurality of video tracks, the first user being permitted to select portions of the at least two clips for use in the first custom track by specifying a start time and an end time of each portion of the at least two clips, wherein changes to only the audio track by the user are subject to third party preapproved parameters, and (ii) allow at least one second user to access the plurality of video tracks, the audio track, and the first custom track via an Internet link.

28. The system of claim 27, wherein the application is further configured to send notification to the at least one second user that the first custom track is available.

29. The system of claim 28, wherein the application is further configured to send the notification automatically.

30. The system of claim 29, wherein the application is further configured to allow the at least one second user to purchase at least a portion of the first custom track.

31. The system of claim 27, wherein the application is further configured to allow the at least one second user to create a second custom track from at least a portion of the first custom track.

32. The system of claim 27, wherein the application is further configured to make the first custom track available as a template to the at least one second user.

33. The system of claim 27, wherein the third party is one of the artist, the venue, or a system owner.

34. A non-transitory computer readable storage medium comprising computer readable instructions for controlling a computer to create a custom track by executing the steps of:
providing at least one artist, venue, and audio track available of a live musical performance, the live musical performance including at least one complete song for selection;
providing at least two pre-recorded video clips associated with the at least one artist, venue, and audio track;
allowing a first user to create a first custom track from at least a portion of the audio track and the at least two video clips, the first user being permitted to select a portion of one of the at least two video clips for use in the first custom track by specifying a start time and an end time of the portion of the video clip, wherein changes to only the audio track by the user are subject to third party preapproved parameters; and
making the first custom track available to at least one second user.

35. The non-transitory computer readable storage medium of claim 34, wherein the third party is one of the artist, the venue, or a system owner.

36. A method for creating a custom track, the method comprising:
providing at least one artist, venue, and audio track available of a live musical performance, the live musical performance including at least one complete song for selection;
providing at least two pre-recorded video clips associated with the at least one artist, venue, and audio track;
allowing a user to create a custom track from at least a portion of the audio track and the at least two video clips, the user being permitted to select a portion of one of the at least two video clips for use in the first custom track by specifying a start time and an end time of the portion of the video clip, wherein changes to only the audio track by the user are subject to third party preapproved parameters; and
determining a cost to the user, the cost being based on at least one of number of songs accessed, number of performances accessed, length of the custom track, time spent by the user accessing the at least two video clips and creating the custom track, a predetermined fee for accessing a predetermined number of performances, artists, or venues, or a premium for a predetermined number of views or audio tracks.

37. The method of claim 36, further comprising:
crediting the user at least a portion of the cost paid by the user when the user possesses a ticket to at least one of the provided live musical performances.

38. The method of claim 36, further comprising:
crediting the user at least a portion of the cost when at least one second user accesses the custom track.

39. The method of claim 36, wherein the third party is one of the artist, the venue, or a system owner.

40. A system for capturing and storing video tracks from at least one live performance, the system comprising:
a plurality of video cameras for recording the at least one live musical performance, the live musical performance including at least one complete song performance at a plurality of positions;
at least one server for storing a plurality of video tracks created from the plurality of video cameras and an audio track common to the plurality of video tracks; and
an application stored on the at least one server, the at least one application being configured to:
(i) allow a user to access the audio track and the plurality of video tracks via an Internet link to create a first custom track by selecting at least a portion of the audio track and combining at least two clips from at least two of the plurality of video tracks, the user being permitted to select portions of the at least two clips for use in the first custom track by specifying a start time and an end time of each portion of the at least two clips, wherein changes to only the audio track by the user are subject to third party preapproved parameters, and
(ii) determine a cost to the user, the cost being based on at least one of time spent by the user accessing the application, a number of songs accessed, a number of performances accessed, length of the custom track, and a predetermined fee for accessing a predetermined number of performances, artists, or venues.

41. The system of claim 40, wherein the third party is one of the artist, the venue, or a system owner.

42. A non-transitory computer readable storage medium comprising computer readable instructions for controlling a computer to create a custom track by executing the steps of:
providing at least one artist, venue, and audio track available of a live musical performance, the live musical performance including at least one complete song for selection;
providing at least two pre-recorded video clips associated with the at least one artist, venue, and audio track;
allowing a user to create a custom track from at least a portion of the audio track and the at least two video clips, the user being permitted to select a portion of one of the at least two video clip for use in the custom track by specifying a start time and an end time of the portion of the video clip, wherein changes to only the audio track by the user are subject to third party preapproved parameters; and
determining a cost to the user, the cost being based on at least one of time spent by the user accessing the at least two video clips and creating the custom track, a number of songs accessed, a number of performances accessed, length of the custom track, and a predetermined fee for accessing a predetermined number of performances, artists, or venues.

43. The non-transitory computer readable storage medium of claim 42, wherein the advertisement is at least one of a commercial displayed with the custom track, a banner advertisement, or a separate web page.

44. The non-transitory computer readable storage medium of claim 42, wherein the third party is one of the artist, the venue, or a system owner.

45. A non-transitory computer readable storage medium comprising computer readable instructions for controlling a computer to create a custom track by executing the steps of:
providing at least one artist, venue, and audio track available of a live musical performance, the live musical performance including at least one complete song for selection;
providing at least one advertisement displayed to the user;
providing at least two pre-recorded video clips associated with the at least one artist, venue, and audio track; and
allowing a user to create a custom track from at least a portion of the audio track and the at least two video clips, the user being permitted to select a portion of one of the at least two video clips for use in the custom track by specifying a start time and an end time of the portion of the video clip, wherein changes to only the audio track by the user are subject to third party preapproved parameters.

46. The non-transitory computer readable storage medium of claim 45, wherein the advertisement is a watermark on the custom track.

47. The non-transitory computer readable storage medium of claim 46, wherein the watermark is at least one of a temporary watermark or a watermark that is present during the entire custom track.

48. The non-transitory computer readable storage medium of claim 45, wherein the advertisement sponsors at least one of a song in the custom track, a series of songs in the custom track, or a segment of the custom track.

49. The non-transitory computer readable storage medium of claim 45, wherein the third party is one of the artist, the venue, or a system owner.

* * * * *